United States Patent [19]

Hung

[11] Patent Number: 5,738,610
[45] Date of Patent: Apr. 14, 1998

[54] HAND-CONTROLLED ACCELERATOR FOR AUTOMOBILES

[76] Inventor: Ching Hsiung Hung, P.O. Box 82-144, Taipei, Taiwan

[21] Appl. No.: 708,059

[22] Filed: Aug. 30, 1996

[51] Int. Cl.⁶ .................................................. B60K 41/20
[52] U.S. Cl. ........................... 477/209; 74/471 R; 74/509; 477/193; 477/199
[58] Field of Search .................................... 477/189, 192, 477/193, 199, 200, 209; 74/509, 501.6, 471 R

[56] References Cited

U.S. PATENT DOCUMENTS

| | | | |
|---|---|---|---|
| 1,627,458 | 5/1927 | Pritchett | 74/509 |
| 1,987,733 | 1/1935 | Dussumier de Fonbrune | 74/471 R |
| 2,979,172 | 4/1961 | Eshbaugh et al. | 477/192 |
| 3,168,942 | 2/1965 | Thorner | 477/193 |
| 3,369,637 | 2/1968 | Anderson | 477/192 |

Primary Examiner—Charles A. Marmor
Assistant Examiner—Sherry Lynn Estremsky
Attorney, Agent, or Firm—A & J

[57] ABSTRACT

A hand-controlled accelerator for automobiles including an inner tubular member formed with a spiral projection on an outer surface thereof and an enlarged base at a lower end thereof, an accelerating cable having an upper end fastened in the base, a brake cable having an upper end fastened in the base, an intermediate tubular member in which is fitted the inner tubular member, a handle having a tubular neck at a lower portion thereof, an outer tubular member in which is fitted the intermediate tubular, and an annular ring-like member having two opposite threaded holes in each of which is arranged a steel ball, a spring having an end bearing against the steel ball, and a screw bearing against another end of the spring, whereby the hand-controlled accelerator for automobiles can prevent the driver from mistakenly depressing the accelerator pedal when desired to apply brake.

3 Claims, 5 Drawing Sheets

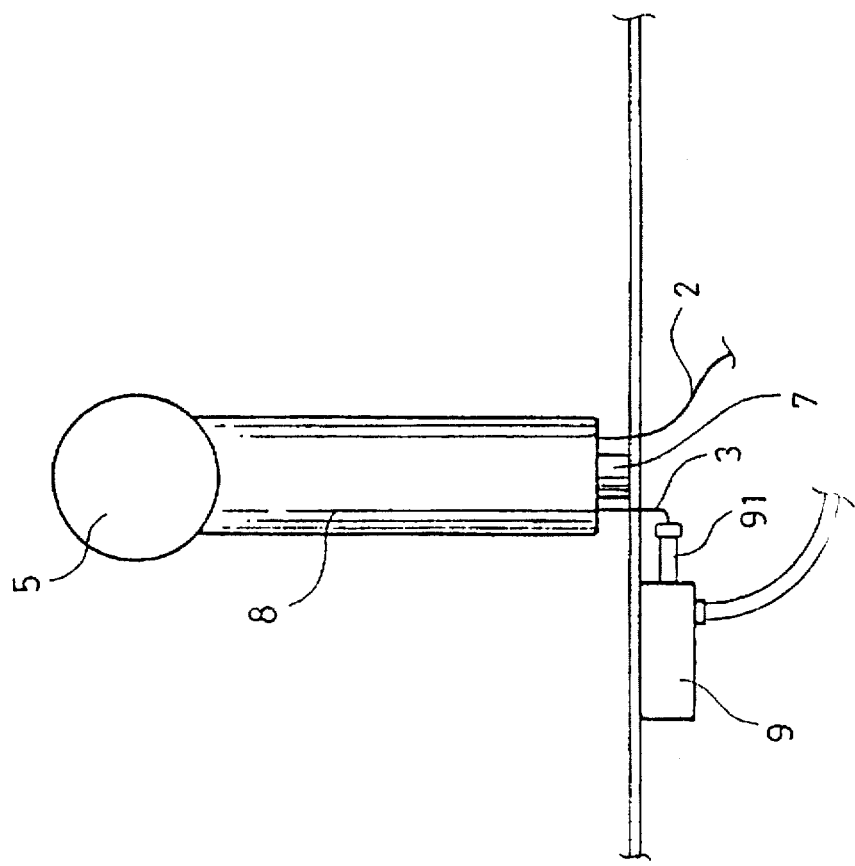
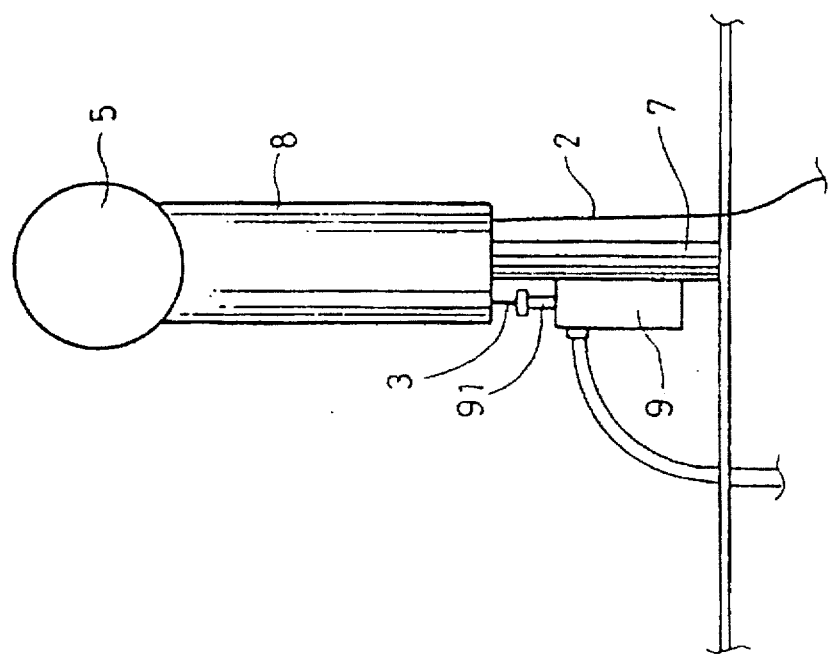
FIG. 5B
FIG. 5A

HAND-CONTROLLED ACCELERATOR FOR AUTOMOBILES

BACKGROUND OF THE INVENTION

1. Field of the Invention

This invention relates to an accelerator for automobiles which is controlled by the hand of a driver.

2. Description of the Prior Art

It has been found that numerous car accidents are caused by mistakenly depressing the accelerator pedal instead of the brake pedal in emergency. Therefore, it is an object of the present invention to provide a hand-controlled accelerator for automobiles which can obviate this drawback.

SUMMARY OF THE INVENTION

This invention relates to a hand-controlled accelerator for automobiles.

It is the primary object of the present invention to provide a hand-controlled accelerator for automobiles which can prevent the driver from mistakenly depressing the accelerator pedal when desired to apply brake.

It is another object of the present invention to provide a hand-controlled accelerator for automobiles which can keep a vehicle to travel at a constant speed.

It is still another object of the present invention to provide a hand-controlled accelerator for automobiles which can prevent an automobile from being stolen.

It is still another object of the present invention to provide a hand-controlled accelerator for automobiles which is easy to control.

It is still another object of the present invention to provide a hand-controlled accelerator for automobiles which is simple in construction.

It is a further object of the present invention to provide a hand-controlled accelerator for automobiles which is fit for practical use.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIGS. 5A and 5B illustrate different installation positions of a pump connected to the accelerating cable.

DETAILED DESCRIPTION OF THE PREFERRED EMBODIMENT

Figure 1:
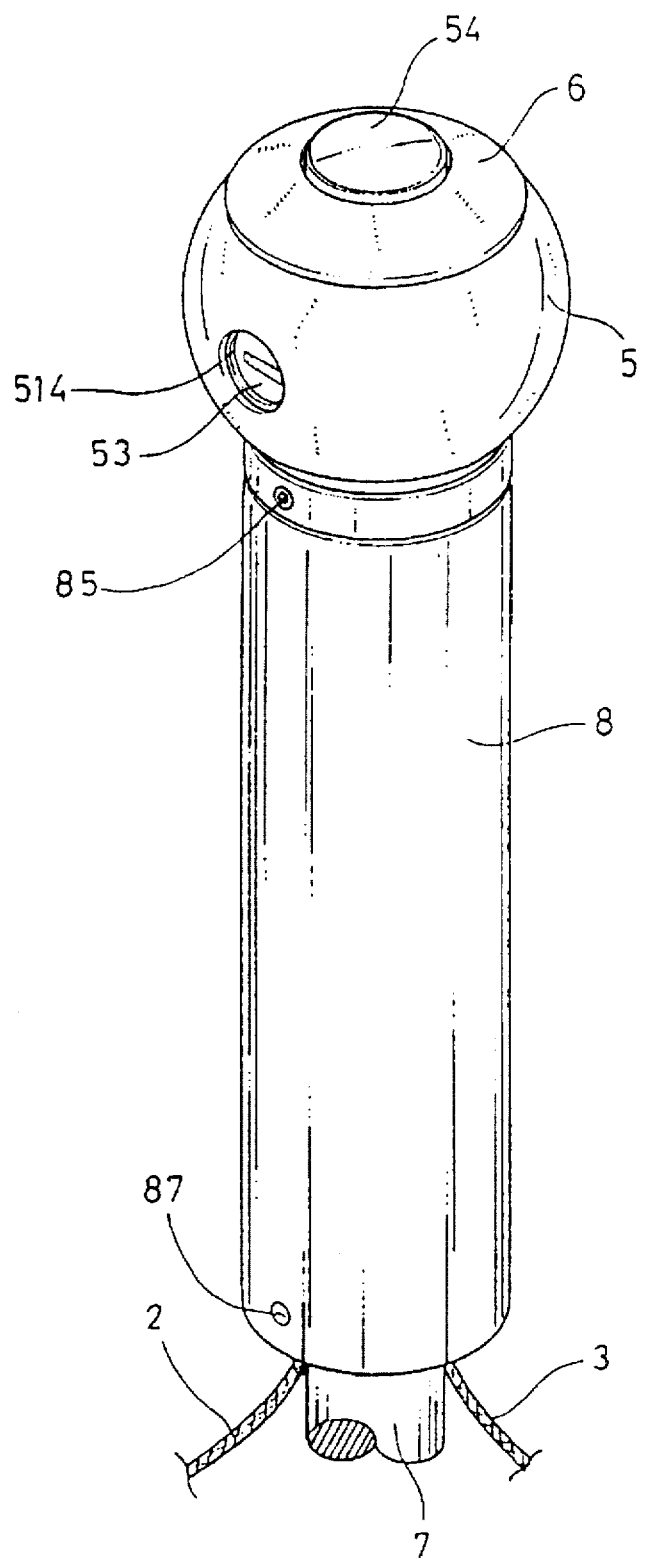
FIG. 1 is a perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
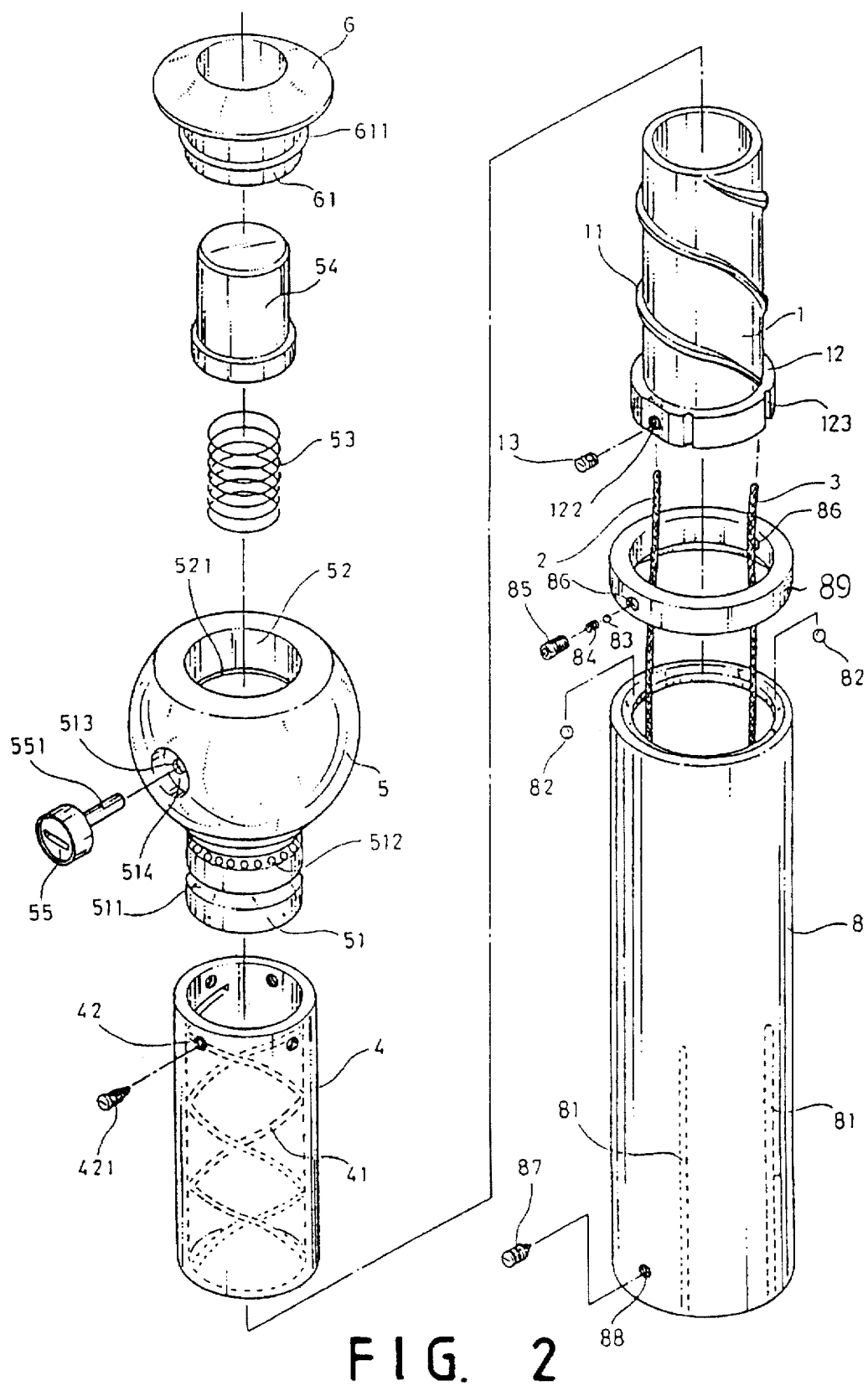
FIG. 2 is an exploded view of the present invention.
Figures 3, 3A:
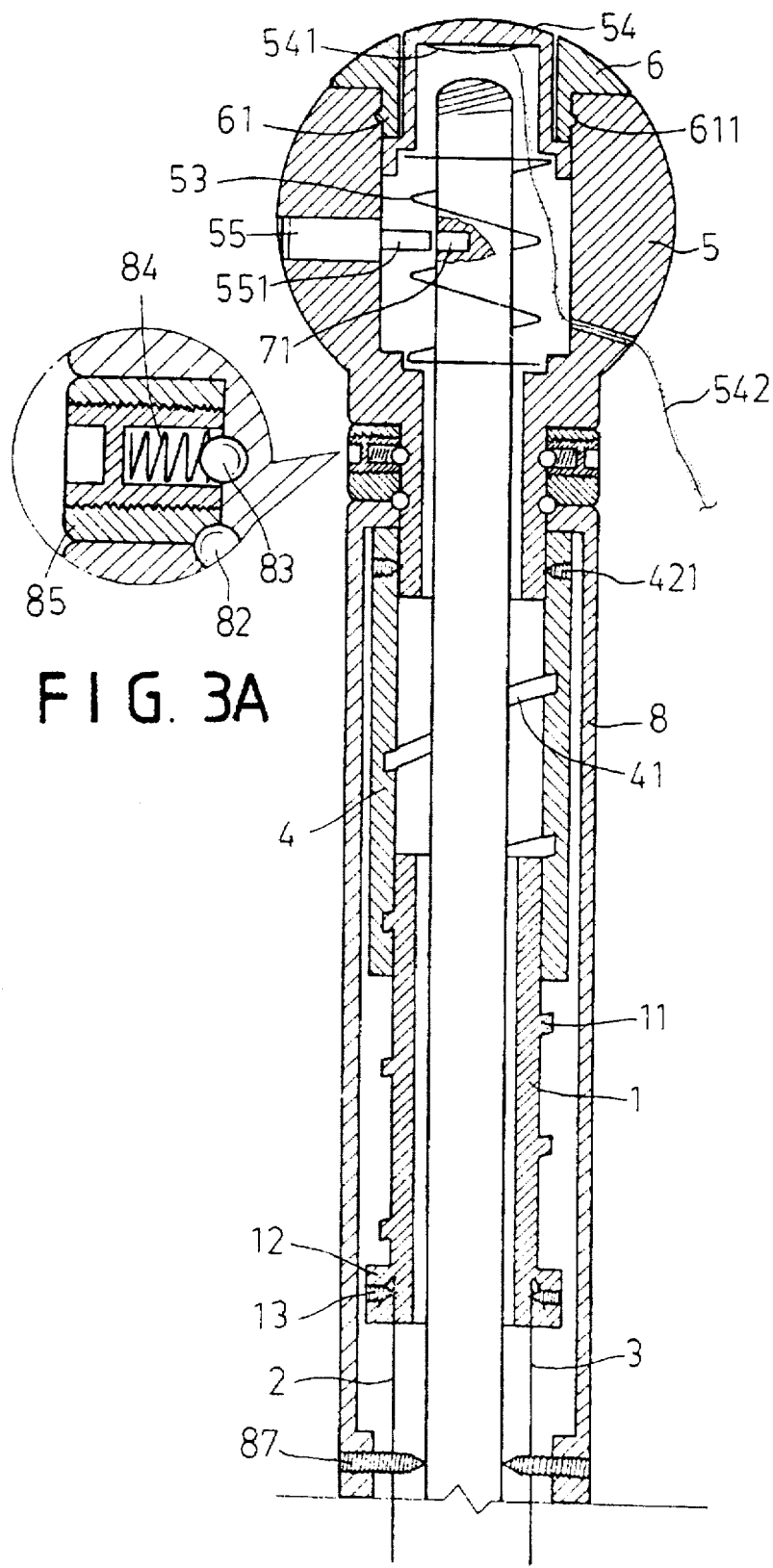
FIG. 3 is a sectional view of the present invention.
FIG. 3A is an enlarged fragmentary view of FIG. 3.

With reference to the drawings and in particular to FIGS. 1 and 2 thereof, a hand-controlled accelerator for automobiles according to the present invention mainly comprises an inner tubular member 1, an intermediate tubular member 4, an outer tubular member 8, a handle 5 and a cap 6.

The inner tubular member 1 is formed with a spiral projection 11 on its outer surface and an enlarged base 12 at the lower portion thereof. The base 12 has two opposite radial threaded holes 122 and two longitudinal holes (not shown) at the bottom which are in communication with the two threaded holes 122 respectively. The threaded holes 122 are adapted to engage with two screws 13. The upper ends of an accelerating cable 2 and a brake cable 3 are inserted into the threaded holes 122 via the longitudinal holes of the base 12 and fastened by the screws 13. The lower end of the accelerating cable 2 is connected to a cable which is originally connected to an accelerator of an automobile.

The inner diameter of the intermediate tubular member 4 is slightly larger than the outer diameter of the inner tubular member 1. The inner surface of the intermediate tubular member 4 is formed with a spiral groove 41 adapted to receive the spiral projection 11 of the inner tubular member 1. The upper end of the intermediate tubular member 4 has two opposite threaded holes 42 adapted to engage with two screws 421.

The handle 5 has an opening 52 at the top formed with an annular groove 521. Within the opening 52 are fitted a spring 53, a knob 54 and a cap 6. The lower end of the handle 5 has a tubular neck portion 51 formed with a plurality of hemispherical recesses 512 and an annular groove 511 below the recesses 512. The tubular neck portion 51 of the handle 5 is inserted into the upper end of the intermediate tubular member 4 and fixedly kept in place by screws 421. The handle 5 is formed with a circular cavity 514 having a horizontal through hole 513. A lock 55 with a bolt 551 is fitted into the circular cavity 513 with the bolt 551 extending into the hole 513. The lock 55 with the bolt 551 may be of any conventional design well known to those skilled in the art and are not considered a part of the invention.

The lower portion of the cap 6 is formed with a neck 61 having an annular projection 611 adapted to engage with the annular groove 521 of the handle 5.

The outer tubular member 8 is preferably made of reinforced plastic or the like in which are fitted the intermediate tubular member 4 and the inner tubular member 1. The inner surface of the outer tubular member 8 has a plurality of vertical ribs 81 adapted to engage with the vertical grooves 123 of the inner tubular member 8 thereby preventing the inner tubular member 8 from being rotated. The upper end of the outer tubular member 8 is formed with a groove for receiving a plurality of steel balls 82. An annular ring-like member 89 having a recessed portion at the lower end is mounted on the upper end of the outer tubular member 8 to prevent the steel balls 82 from dropping out of the outer tubular member 8. The annular ring-like member 89 is formed with two opposite threaded holes 86 in each of which are fitted a steel ball 83, a spring 84 and a hexagonal screw 85.

When desired to mount the present invention on a gearshift lever 7, it is only necessary to remove the upper end of the gearshift lever 7, put the present invention over the gearshift lever 7, and fasten the outer tubular member 8 on the gearshift lever 7 by turning screws 87 into the threaded holes 88 at the lower end (see FIGS. 1, 2, 3 and 3A). There is a distance between the inner top of the knob 54 and the upper end of the gearshift lever 7. The inner top of the knob 54 is provided with a conductive member which is electrically connected to a horn (not shown) via an electrical wire 542 so that when the knob 54 is depressed to contact the gearshift lever 7, the horn will be actuated to sound a warning signal. In addition, the handle 5 can be kept at a fixed position by operating the lock 55 to insert the bolt 551 into a hole 71 of the gearshift lever 7.

Figure 4:
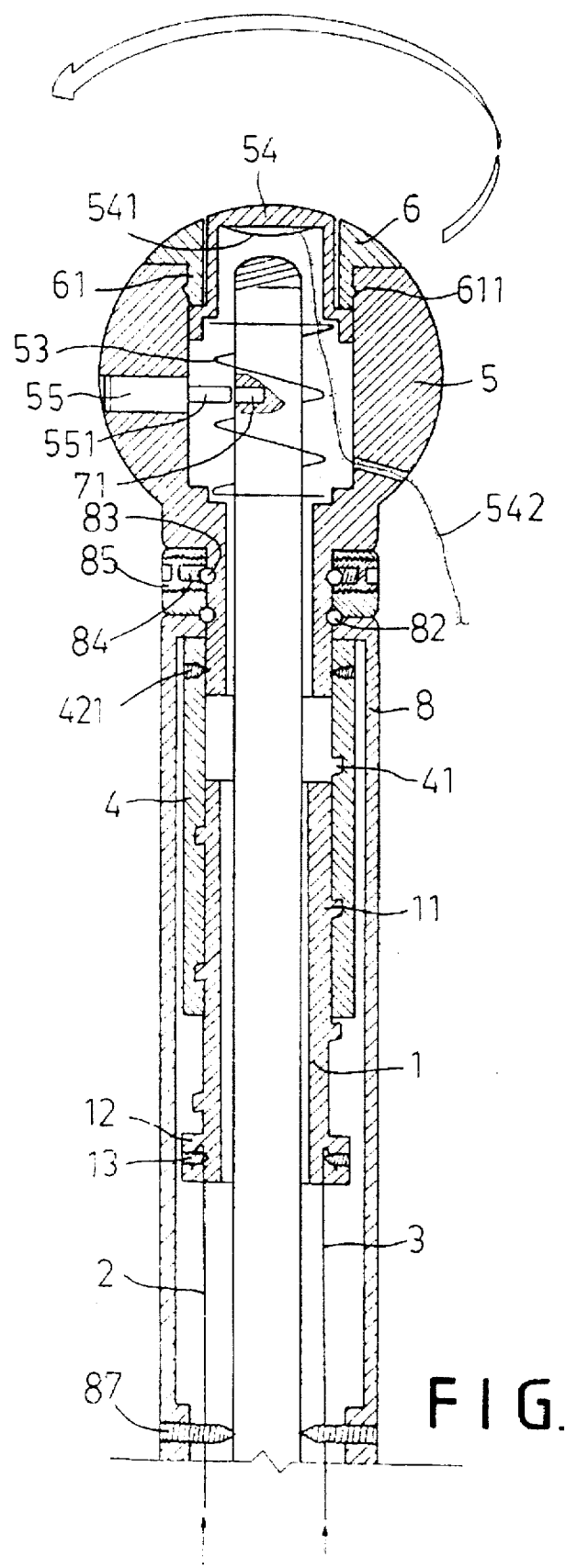
FIG. 4 is working view of the present invention.

The working principle of the present invention is disclosed in FIG. 4. As illustrated, when desired to increase speed, it is only necessary to turn the handle 5 in the arrow direction so that the inner tubular member 1 will be moved upwardly into the intermediate tubular member 4 thereby pulling the accelerating cable 2 to increase speed. Similarly, when desired to decrease speed, it is only necessary to turn the handle 5 in a reversed direction so that the inner tubular member 1 will be moved downwardly out of the intermediate tubular member 4 thus releasing the accelerating cable 2 to decrease speed. By means of engagement between the steel balls 83 and the recesses 512, the handle 521 may be kept in place thus maintaining the speed. As the brake is applied, the braking cable 3 will be pulled downwardly thereby preventing the handle 5 to move the inner tubular member 1 to go upwardly and therefore, preventing the driver from increasing speed in the case of applying brake.

As shown in FIG. 5A and 5B, the braking cable 3 is connected to a pump 9 which is preferably mounted on the gearshift lever 7 or arranged on the bottom of a car and which will transmit brake oil at the same time as the brake is applied. The length of the brake cable 3 is designed so that the brake cable 3 will be straightened when the inner tubular member 1 is located at its highest position and the brake cable 3 will drop into the pump 9 when the inner tubular member 1 is moved downwardly to decrease speed. The accelerating cable 2 is connected to a cable which is originally connected to an accelerator of an automobile.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A hand-controlled accelerator for automobiles comprising:

an inner tubular member formed with a spiral projection on an outer surface thereof and an enlarged base at a lower end thereof;

an accelerating cable having an upper end fastened in said base;

a brake cable having an upper end fastened in said base;

an intermediate tubular member in which is fitted said inner tubular member, said intermediate tubular member being formed at an inner surface thereof with a spiral groove adapted to receive said spiral projection;

a handle having a tubular neck at a lower portion thereof, said tubular neck having a plurality of recesses and an annular groove below said recesses and fixedly connected to an upper end of said intermediate tubular member;

an outer tubular member in which is fitted said intermediate tubular member; and an annular ring-like member having two opposite threaded holes in each of which is arranged a steel ball, a spring having an end bearing against said steel ball, and a screw bearing against another end of said spring, said annular ring-like member being fitted over said tubular neck.

2. The hand-controlled accelerator for automobiles as claimed in claim 1, wherein said handle has an opening at a top thereof in which is fitted a helical spring, a knob arranged on said helical spring, and a cap fitted on said knob, said knob having an inner top provided with a conductive member.

3. The hand-controlled accelerator for automobiles as claimed in claim 1, wherein said handle is provided with a lock having a bolt adapted to fit into a hole of a gearshift lever of an automobile.

* * * * *